2 Sheets--Sheet 1.

G. T. & A. SMITH.

Flour-Bolts.

No. 6,198. Reissued Dec. 29, 1874.

*Witnesses:*
Henry Orth
Jno J Hallister Jr

*Inventor:*
George T Smith
Aaron Smith
by H H Doubleday atty

THE GRAPHIC CO. PHOTO-LITH. 39 & 41 PARK PLACE, N.Y.

2 Sheets--Sheet 2.

G. T. & A. SMITH.

Flour-Bolts.

No. 6,198. Reissued Dec. 29, 1874.

Witnesses:
Henry Orth
Jno J. Hallister Jr.

Inventor:
George T. Smith
Aaron Smith
by H. H. Doubleday atty.

THE GRAPHIC CO. PHOTO-LITH. 39 & 41 PARK PLACE, N.Y.

UNITED STATES PATENT OFFICE.

GEORGE T. SMITH, OF MINNESOTA CITY, AND AARON SMITH, OF HASTINGS, MINNESOTA.

IMPROVEMENT IN FLOUR-BOLTS.

Specification forming part of Letters Patent No. 135,496, dated February 4, 1873; reissue No. 6,198, dated December 29, 1874; application filed December 21, 1874.

DIVISION B.

*To all whom it may concern:*

Figure 1:
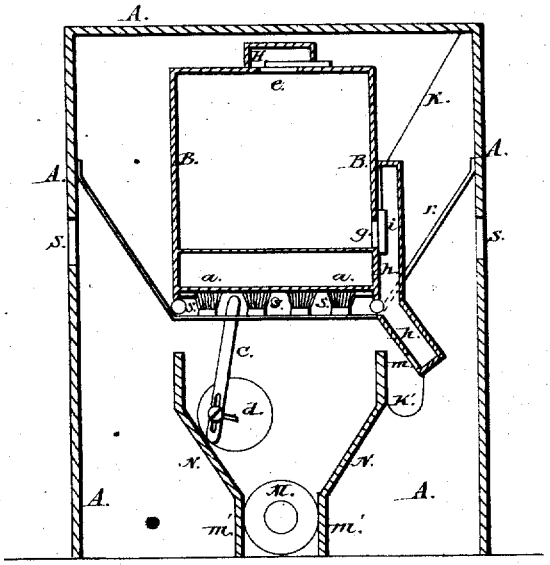
Figure 4:
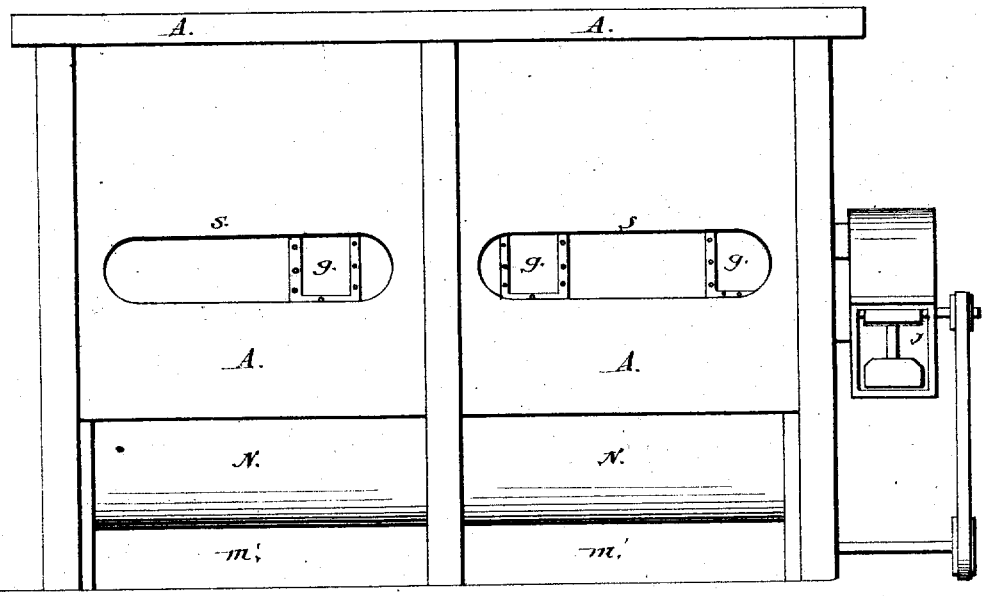
Figure 3:
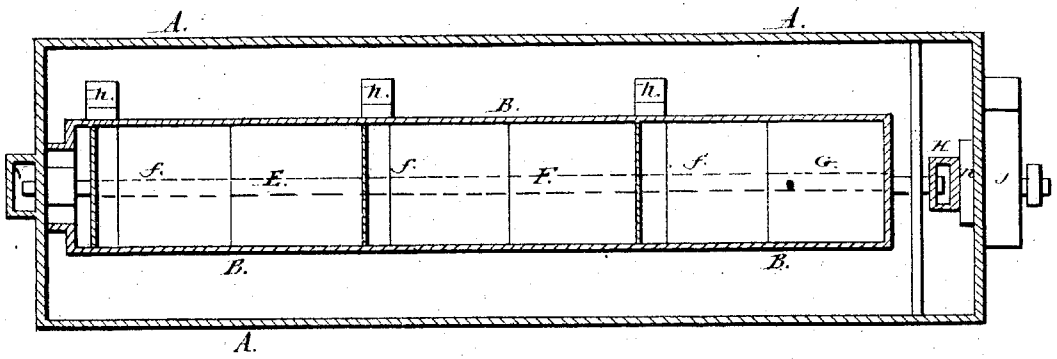
Figure 2:
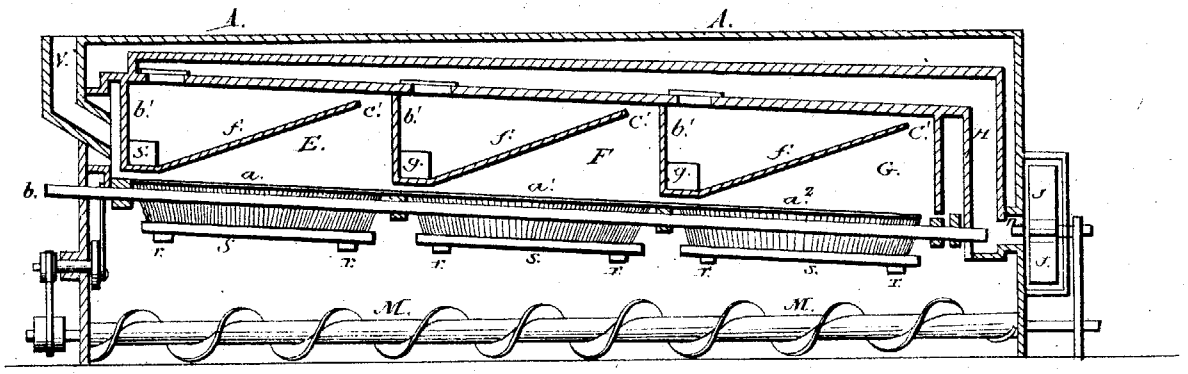

Be it known that we, GEORGE T. SMITH, formerly of Washington, District of Columbia, but now of Minnesota City, Minnesota, and AARON SMITH, of Hastings, Minnesota, have invented a Flour-Dressing Machine, of which the following is a specification:

In the drawings, Figure 1 is a vertical transverse section, showing spouts attached to the air-chamber or bolting-case, and adapted to receive material through openings *g*. Fig. 2 is a vertical longitudinal section. Fig. 3 is a horizontal section; and Fig. 4 is a side elevation without the spouts *h*, and having the lower part of the outside casing removed to show the gather-boards and conveyer.

A is the frame-work and casing. Inside this casing is a bolting-case, B, closed, except as hereinafter mentioned, at the top, sides, and ends, and with a bolting-cloth, *a*, to cover the bottom. The case B rests upon, and is oscillated on, shaft *b* by means of pitman *c* and crank-wheel *d*. The bolting-case is divided by partition into three sections, E F G, each having an adjustable opening, *e*, at the top into the suction air-tube H. This tube passes over the top of the bolt-case B and down its rear end, till it meets and opens into a tube, *n*, attached to the case A and connected with a suction-fan, J. In each section of the air-chamber is a shelf, *f*, and at one side is an opening, *g*, into a spout, *h*, the opening being covered, in Fig. 1, by a gate, *i*, which is fitted with a cord, *k*, at the top, and with a spring at the bottom. Another gate, *m*, is fitted with a cord, *k'*, and a spring. *r r* are belts, fastened at the ends to the outer case, and running over pulleys on the lower part of the bolting-case. Attached to these belts are brushes *s s*. V is a hopper, for feeding the meal to the bolt. M is the conveyer, and we prefer to connect it with the driving-power, and belt from it to the wheel *d* and fan J. S' are openings in the outer case.

The material to be bolted is fed in through hopper V, and, as the bolt is oscillated, is thrown from side to side, sliding across the cloth and sifting through it. As the air is drawn up by the suction-fan through the cloth the lighter portion of the bran and specks pass over the tops of the shelves *f*, some of it being carried off by the fan, and some falling to the bottom of the shelves. As the bolt is oscillated toward the side on which the spouts are placed, the cord *k* opens the gate *i*, and the last-mentioned portion of the refuse is discharged into the spout, the reverse motion closing the gate *h* and opening gate *m*, so that this refuse may pass out.

We do not, in this division of reissue, make any claim to the pockets above the bolting-surface, to the openings through the case into these pockets, nor to the oscillating bolt, these devices being embraced in Division A, of even date herewith.

In some cases it would not be necessary to have as many brushes beneath the cloth as are shown in the drawing, as, when the center of oscillation is raised, one or two might be sufficient.

What we claim in this division of reissue is—

In combination with an oscillating bolt, the belts *r r* and brushes *s*, substantially as set forth.

GEORGE T. SMITH.
AARON SMITH.

Witnesses to GEO. T. SMITH:
W. H. YALE,
CHAS. F. ROWELL.
Witnesses to AARON SMITH:
WALTER W. ADAMS,
THEODORE BACON.